(12) United States Patent
Voisin

(10) Patent No.: US 9,109,739 B2
(45) Date of Patent: Aug. 18, 2015

(54) PIPE COATING REPAIR SYSTEM

(71) Applicant: Andrew Voisin, London (CA)

(72) Inventor: Andrew Voisin, London (CA)

( * ) Notice: Subject to any disclaimer, the term of this patent is extended or adjusted under 35 U.S.C. 154(b) by 0 days.

(21) Appl. No.: 14/467,232

(22) Filed: Aug. 25, 2014

(65) Prior Publication Data

US 2015/0053296 A1    Feb. 26, 2015

(30) Foreign Application Priority Data

Aug. 23, 2013  (CA) .................................... 2824557

(51) Int. Cl.
*F16L 55/16*  (2006.01)
*F16L 55/168*  (2006.01)
*F16L 55/18*  (2006.01)

(52) U.S. Cl.
CPC ............. *F16L 55/1683* (2013.01); *F16L 55/18* (2013.01)

(58) Field of Classification Search
CPC ............................... F16L 55/1683; F16L 55/18
USPC ...................................................... 138/99, 97
See application file for complete search history.

(56) References Cited

U.S. PATENT DOCUMENTS

| | | | |
|---|---|---|---|
| 3,150,690 A * | 9/1964 | Danielson et al. | 138/99 |
| 3,907,625 A * | 9/1975 | Vogelsanger | 156/253 |
| 4,086,934 A * | 5/1978 | Bagwell et al. | 137/322 |
| 4,472,468 A | 9/1984 | Tailor et al. | |
| 4,695,335 A | 9/1987 | Lyall | |
| 5,482,087 A * | 1/1996 | Overbergh et al. | 138/110 |
| 8,507,832 B2 | 8/2013 | Gueugnaut et al. | |
| 2006/0272724 A1* | 12/2006 | Borland et al. | 138/99 |
| 2007/0034316 A1* | 2/2007 | Perez et al. | 156/95 |
| 2008/0017263 A1* | 1/2008 | Robinson et al. | 138/99 |
| 2008/0216938 A1* | 9/2008 | Rice | 156/77 |
| 2010/0000621 A1* | 1/2010 | Kamata et al. | 138/99 |
| 2010/0012215 A1* | 1/2010 | Morton et al. | 138/99 |
| 2010/0154913 A1 | 6/2010 | Brooks et al. | |
| 2013/0341320 A1 | 12/2013 | Tailor et al. | |

* cited by examiner

*Primary Examiner* — Patrick F Brinson

(57) ABSTRACT

An assembly for repairing a damaged portion of a fusion bonded epoxy coating on a steel body of a pipe at least partially surrounded by an undamaged portion of the coating. The assembly includes a housing defining a cavity therein and having an opening in communication with the cavity, the housing being attachable to the pipe to locate the cavity in communication with an epoxy patch positioned on the steel body to replace at least the damaged portion. The assembly also includes a heat source positioned for directing heated air heated thereby into the cavity, for curing the epoxy patch. The opening is at least partially defined by a perimeter, and the assembly includes an insulation strip positioned on the perimeter for impeding heat transfer from the housing to the undamaged portion of the coating when the housing is attached to the pipe.

17 Claims, 17 Drawing Sheets

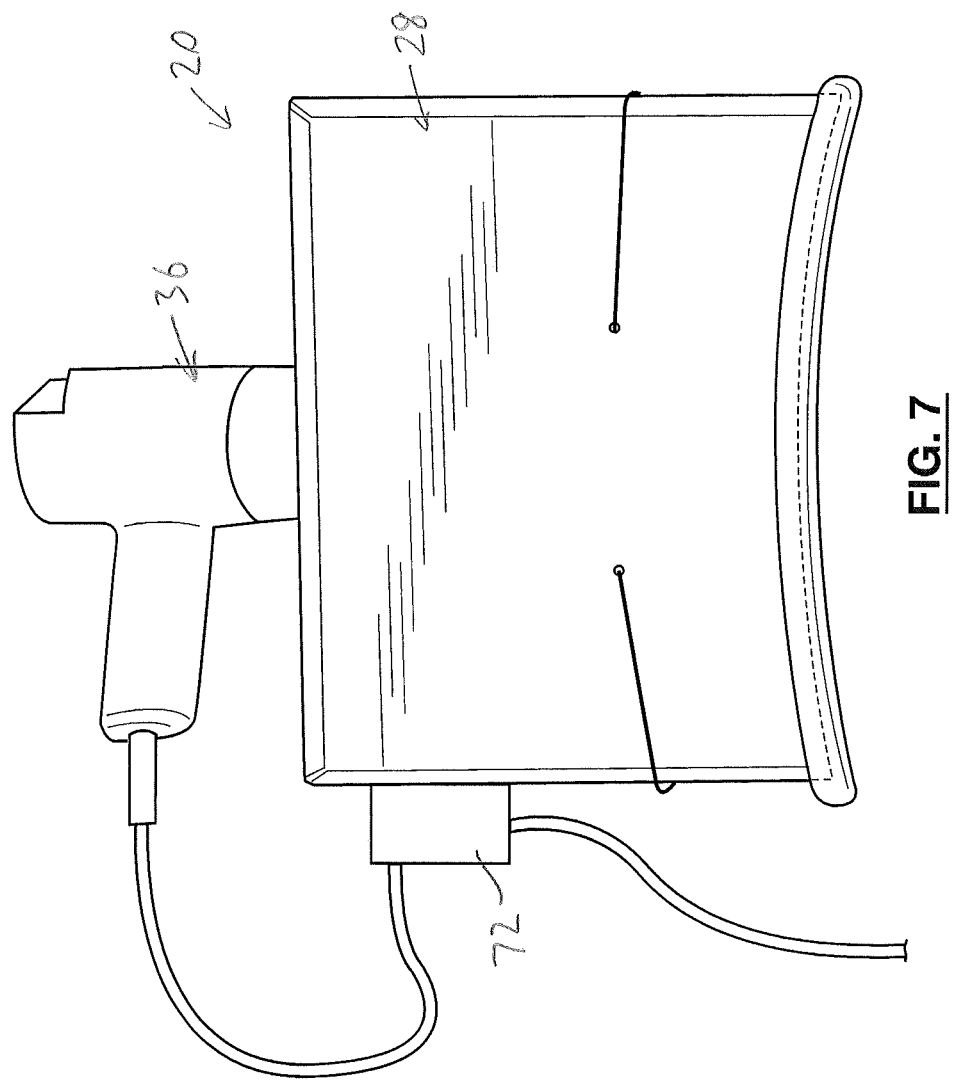

```
┌─────────────────────────────────────────────────────────────────────────┐
│  providing an assembly including a housing defining a cavity therein and│
│  including at least one opening in communication with the cavity, the at│
│  least one opening being at least partially defined by a perimeter of the│──113
│  housing, the heating system comprising at least one heat source and an │
│  insulation strip positioned on the perimeter for impeding heat transfer│
│  from the housing to the undamaged portion of the coating               │
└─────────────────────────────────────────────────────────────────────────┘
                                      │
┌─────────────────────────────────────────────────────────────────────────┐
│  locating the housing to position the insulation strip at least partially│──115
│  between the housing and the undamaged portion of the epoxy coating     │
└─────────────────────────────────────────────────────────────────────────┘
                                      │
┌─────────────────────────────────────────────────────────────────────────┐
│  with an air temperature sensor, sensing a first air temperature of air │──117
│  in the cavity                                                          │
└─────────────────────────────────────────────────────────────────────────┘
                                      │
┌─────────────────────────────────────────────────────────────────────────┐
│  with a hygrometer, sensing a first humidity of the air in the cavity   │──119
└─────────────────────────────────────────────────────────────────────────┘
                                      │
┌─────────────────────────────────────────────────────────────────────────┐
│  determining a first dew point of the air in the cavity                 │──121
└─────────────────────────────────────────────────────────────────────────┘
                                      │
┌─────────────────────────────────────────────────────────────────────────┐
│  with an infrared temperature sensor, sensing a first surface temperature│──123
│  of the damaged portion                                                 │
└─────────────────────────────────────────────────────────────────────────┘
                                      │
┌─────────────────────────────────────────────────────────────────────────┐
│  if the first surface temperature does not exceed the first dew point by│
│  at least 3°C, then with said at least one heat source, heating the air │
│  in the cavity to increase the surface temperature of the damaged portion│──129
│  to at least 3°C greater than the first dew point, to prevent condensation│
│  of water on the damaged portion                                        │
└─────────────────────────────────────────────────────────────────────────┘
                                      │
┌─────────────────────────────────────────────────────────────────────────┐
│                         removing the housing                            │──131
└─────────────────────────────────────────────────────────────────────────┘
                                      │
┌─────────────────────────────────────────────────────────────────────────┐
│  removing at least the damaged portion of the coating to expose an area │──133
│  of the steel body at least partially surrounded by the undamaged portion│
│  of the coating                                                         │
└─────────────────────────────────────────────────────────────────────────┘
                                      │
┌─────────────────────────────────────────────────────────────────────────┐
│  locating the housing to position the cavity in communication with at   │
│  least part of the area and the insulation strip at least partially     │──135
│  between the housing and the undamaged portion of the coating           │
└─────────────────────────────────────────────────────────────────────────┘
                               to figure 11B
```

FIG. 11A from figure 11A

- with the air temperature sensor, sensing a second air temperature of the air in the cavity — 137

- with the hygrometer, sensing a second humidity of the air in the cavity — 139

- determining a second dew point of the air in the cavity — 143

- with the infrared temperature sensor, sensing a second surface temperature of the exposed area of the steel body — 145

- if the second surface temperature does not exceed the second dew point by at least 3°C, then with said at least one heat source, heating the air in the cavity to increase the surface temperature of the prepared region to at least 3°C greater than the second dew point, to prevent condensation of water on the exposed area — 147

- positioning an epoxy patch on the exposed area — 149

- locating the housing to position in communication with the cavity at least part of the epoxy patch — 151

- with said at least one heat source, generating the heat to heat the air in the cavity to cure the epoxy patch — 153

- with the infrared temperature sensor, monitoring the temperature of the patch — 155

- based on preselected parameters, determining when the patch is cured and — 157

- upon determining that the epoxy patch is cured, removing the housing from at least partial engagement with the undamaged portion of the epoxy coating — 159

FIG. 11B

```
┌─────────────────────────────────────────────────────────────────────┐  ╱211
│ providing a housing defining a cavity therein and comprising at     │
│ least one opening in communication with the cavity, said at least   │─261
│ one opening being at least partially defined by a perimeter of the  │
│ housing                                                             │
└─────────────────────────────────────────────────────────────────────┘
                                    │
┌─────────────────────────────────────────────────────────────────────┐
│ providing at least one heat source positioned for directing heated  │─263
│ air generated thereby at least partially into the cavity            │
└─────────────────────────────────────────────────────────────────────┘
                                    │
┌─────────────────────────────────────────────────────────────────────┐
│ providing an insulation strip positioned on the perimeter for       │─265
│ impeding heat transfer from the housing to the coating on the pipe  │
└─────────────────────────────────────────────────────────────────────┘
                                    │
┌─────────────────────────────────────────────────────────────────────┐
│ removing at least the damaged portion to expose an area of the      │─267
│ steel body                                                          │
└─────────────────────────────────────────────────────────────────────┘
                                    │
┌─────────────────────────────────────────────────────────────────────┐
│ preparing the exposed area of the steel body for bonding with an    │─269
│ epoxy patch                                                         │
└─────────────────────────────────────────────────────────────────────┘
                                    │
┌─────────────────────────────────────────────────────────────────────┐
│ positioning the epoxy patch on the exposed area of the steel body   │─271
└─────────────────────────────────────────────────────────────────────┘
                                    │
┌─────────────────────────────────────────────────────────────────────┐
│ locating the housing to position the cavity in communication with   │─273
│ at least part of the epoxy patch                                    │
└─────────────────────────────────────────────────────────────────────┘
                                    │
┌─────────────────────────────────────────────────────────────────────┐
│ energizing said at least one heat source to generate the heated air │─275
│ thereby directed into the cavity                                    │
└─────────────────────────────────────────────────────────────────────┘
                                    │
┌─────────────────────────────────────────────────────────────────────┐
│ with a diffuser element located in the cavity, mixing the heated    │
│ air with air in the cavity to provide an air mixture in the cavity  │─277
│ having a substantially consistent temperature throughout for curing │
│ the epoxy patch                                                     │
└─────────────────────────────────────────────────────────────────────┘
```

FIG. 12

PIPE COATING REPAIR SYSTEM

FIELD OF THE INVENTION

The invention is a system for repairing a damaged portion of a fusion bonded epoxy coating on a pipe.

BACKGROUND OF THE INVENTION

Typically, a pipe "P" formed to be included in a pipeline includes a steel body "S" covered on its exterior with a fusion bonded epoxy coating ("FBE coating") to protect the steel body (FIG. 1). (As will be described, embodiments of the invention are illustrated in the balance of the attached drawings.) The FBE coating is an epoxy-based coating that is also used to protect steel in other applications.

Typically, the steel body's exterior surface is completely coated with the FBE coating when the pipe "P" is delivered to the site at which the pipe is to be installed. As is well known in the art, during pipeline construction, the epoxy coating typically is damaged or worn away in relatively small areas, for a variety of reasons. For example, a damaged portion "D" is illustrated in FIG. 1. For the purposes hereof, it will be understood that the "damaged portion" of the coating may include (i) parts of the coating that are scraped or otherwise damaged and are positioned on the steel body, and/or (ii) any regions where the coating had been removed, exposing the steel body.

When repairing the damaged portion (i.e., damaged or removed) of the FBE coating, initially, any damaged epoxy coating still in place is removed, and the steel body is abraded, so that the new epoxy which is positioned on the steel body will bond with the steel body when it is cured. When the damaged portion "D" is removed and the steel body has been suitably abraded, an area "A" of the steel body "S" is exposed. As can be seen in FIG. 1, the area "A" of the exposed steel body "S" is at least partially defined by existing and securely bonded epoxy coating "M". Those skilled in the art would appreciate that it is important to avoid damaging the bonded coating "M" in the vicinity of the area "A" when repairing the area "A".

As is well known in the art, it is very important that the area "A" is covered with replacement epoxy that is bonded to the steel. The bonding is achieved when the epoxy is properly cured. The steel body's exterior surface, before installation in the ground or otherwise, is required to be completely covered with the FBE coating, in accordance with specifications.

Heat may be required to be applied in order to prepare the area "A" of exposed and abraded steel for the application of epoxy thereto. (The exposed steel body is required to be at least 3° C. warmer than the dew point when the epoxy is applied.) Once the epoxy is applied, heat is required (i.e., an appropriate amount, for an appropriate time) to cure the epoxy.

In practice, preheating, and also heating the newly-applied epoxy to cure it, so that the epoxy bonds to the exposed steel to form the FBE coating, is a time-consuming and difficult task. The task may be difficult for a variety of reasons. For example, in very cold weather, preheating may take some time. Also, in cold weather, the epoxy must be carefully heated to the appropriate temperature for the necessary time, but without burning the epoxy. In addition, if fluid is flowing through the pipe on which the epoxy is to be cured, the fluid may affect the temperature of the pipe, sometimes in ways that are difficult to anticipate.

In order to cure the epoxy properly, the correct amount of heat is required to be applied, for the correct time period. Neither too much nor too little heat is acceptable. However, the area of pre-existing (securely bonded) epoxy material "M" surrounding the exposed steel in the area "A" is to be disturbed as little as possible.

In the prior art, a heat gun has commonly been used to preheat the area "A" and to cure epoxy on the area "A" of exposed steel. The heat gun typically used is a hand-held electric heat gun. However, in practice the epoxy often is provided with more heat than is appropriate using this method, with the result that the epoxy patch is not properly cured, and does not bond to the steel as required. For instance, the epoxy is sometimes burned using this method.

As is known, the exposed area "A" of the steel body may alternatively be preheated using a propane blowtorch. This is also difficult to control in practice, and may, if not properly controlled, cause the surrounding securely bonded coating "M" to burn. The burned epoxy coating must then be replaced. In addition, use of the propane blowtorch may result in contamination of the exposed area "A", which is then required to be sandblasted to remove the contamination.

Another prior art device is a generally cylindrical can, open at one end, with a heat source such as a heat gun mounted therein. The advantage of this device is that it positions the heat gun at a generally consistent distance from the steel body and also from the epoxy, so that an appropriate amount of heat is provided. However, in practice, the can tends to overheat, and its rim engaging the pre-existing material "M" conducts heat to such material, thereby causing the material "M" to melt. This requires further repairs, to repair the damage to the material "M". Also, because the can is cylindrical and it is radially positioned relative to the pipe, the can's rim only partially engages the curved pipe, and heat escapes via the gaps between the pipe and the can, and is therefore wasted.

SUMMARY OF THE INVENTION

There is a need for a system that overcomes or mitigates one or more of the defects or disadvantages of the prior art. Such defects or disadvantages are not necessarily included in those listed above.

In its broad aspect, the invention provides an assembly for repairing a damaged portion of a fusion bonded epoxy coating on a steel body of a pipe at least partially surrounded by an undamaged portion of the coating. The assembly includes a housing defining a cavity therein and having one or more openings in communication with the cavity, the housing being attachable to the pipe to locate the cavity in communication with an epoxy patch positioned on the steel body to replace at least the damaged portion. The assembly also includes one or more heat sources positioned for directing heated air heated thereby into the cavity, for curing the epoxy patch. The opening is at least partially defined by a perimeter, and the assembly also includes an insulation strip positioned on the perimeter for impeding heat transfer from the housing to the undamaged portion of the coating when the housing is attached to the pipe.

In another aspect, the invention provides a system for repairing a damaged portion of a fusion bonded epoxy coating on a steel body of a pipe. The system includes an epoxy patch positionable on the steel body, to replace at least the damaged portion, and a housing defining a cavity therein and comprising an opening in communication with the cavity, the housing being attachable to the pipe to locate the cavity in communication with the epoxy patch. The system also includes a heat source positioned for directing heated air heated thereby into the cavity, for curing the epoxy patch. The opening is at least partially defined by a perimeter, and the assembly includes an insulation strip positioned on the perimeter for impeding heat transfer from the housing to the undamaged portion of the coating when the housing is secured to the pipe.

In another aspect, the invention provides a method of curing an epoxy patch to repair a damaged portion of a fusion bonded epoxy coating on a steel body of a pipe. The method includes providing a housing defining a cavity therein and having an opening in communication with the cavity, the opening being at least partially defined by a perimeter of the housing. A heat source is provided that is positioned for directing heated air generated thereby at least partially into the cavity. An insulation strip is provided that is positioned on the perimeter, for impeding heat transfer from the housing to the coating on the pipe. At least the damaged portion is removed, to expose an area of the steel body. The exposed area of the steel body is prepared for bonding with an epoxy patch. The epoxy patch is positioned on the exposed area of the steel body. The housing is located to position at least part of the epoxy patch in communication with the cavity. The heat source is energized to generate the heated air thereby directed into the cavity. Finally, with a diffuser element located in the cavity, the heated air from the heat source is mixed with air in the cavity to provide a heated air mixture in the cavity having a substantially consistent temperature throughout for curing the epoxy patch.

BRIEF DESCRIPTION OF THE DRAWINGS

The invention will be better understood with reference to the attached drawings, in which:

FIG. 7 is a side view of an alternative embodiment of the assembly of the invention, drawn at a larger scale;

FIG. 11A is a flow chart schematically illustrating a portion of an embodiment of a method of the invention;

FIG. 11B is a flow chart schematically illustrating the other portion of the method partially illustrated in FIG. 11A;

FIG. 12 is a flow chart schematically illustrating another embodiment of the method of the invention.

DETAILED DESCRIPTION

Figure 1:
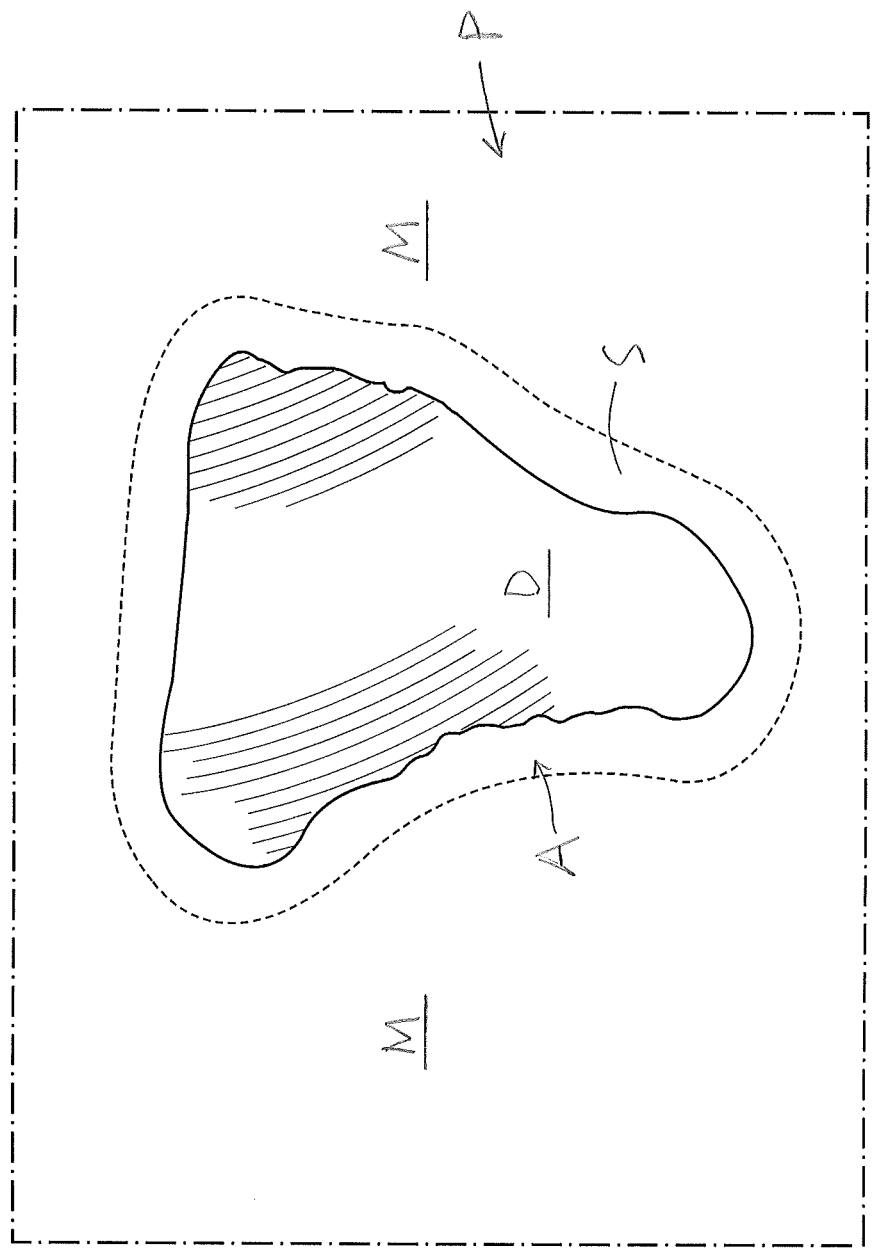
FIG. 1 (also described previously) is a plan view of a portion of a pipe on which an FBE coating thereon is to be repaired.
Figure 2:
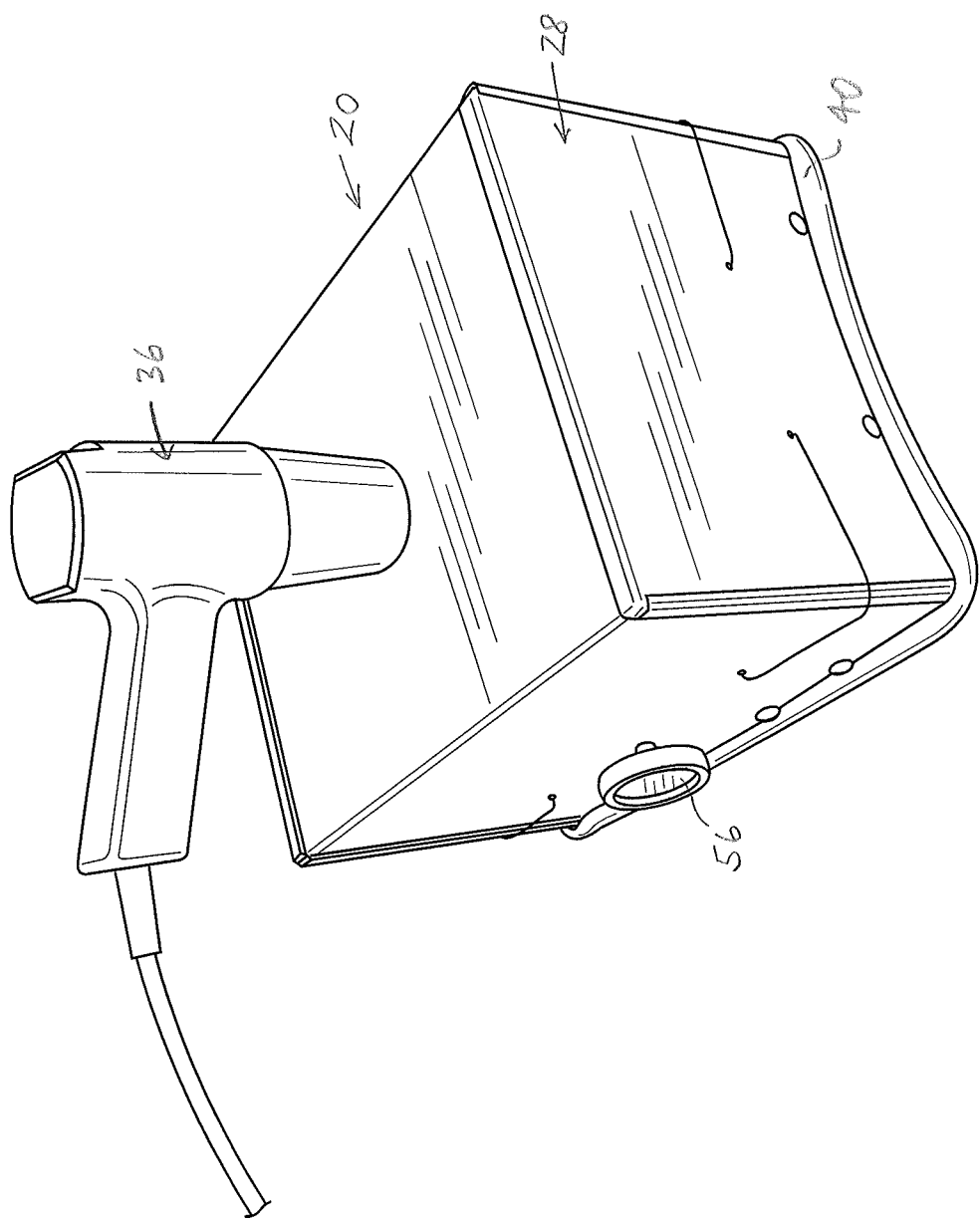
FIG. 2 is an isometric view of an embodiment of an assembly of the invention, the assembly including an embodiment of a housing of the invention.
Figure 3:
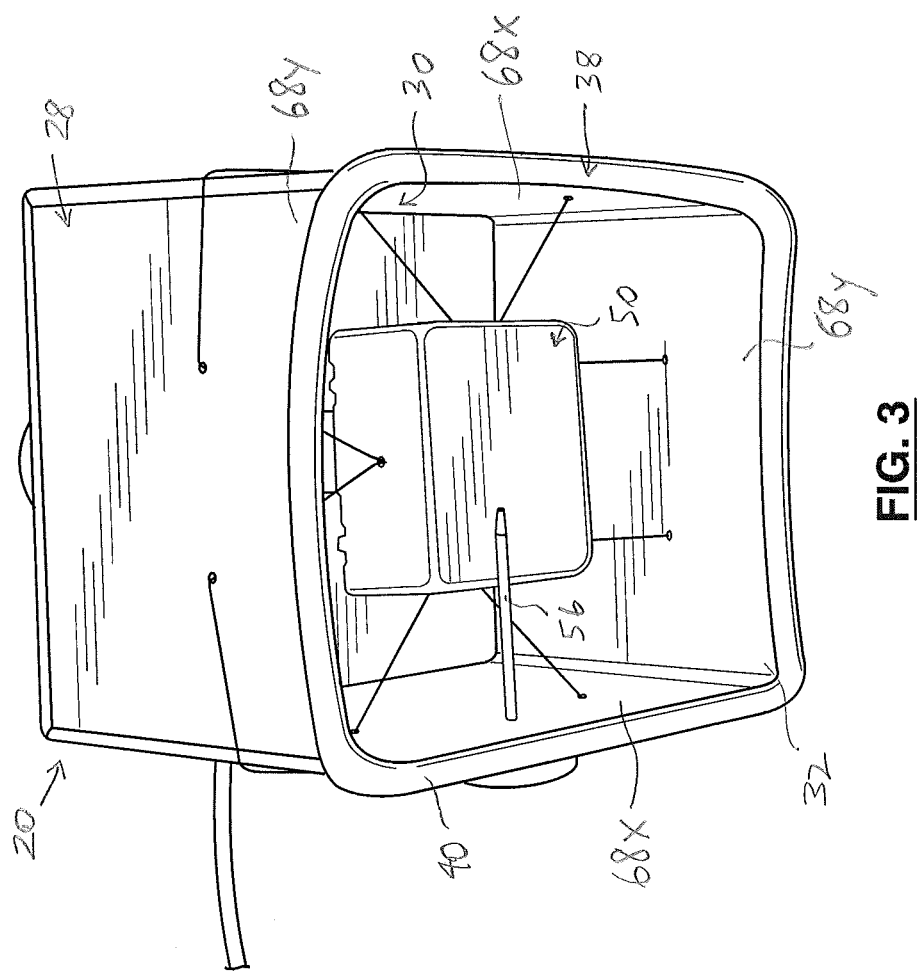
FIG. 3 is another isometric view of the assembly of FIG. 2 in which a cavity at least partially defined by the housing is partially observable via an opening in the housing.
Figure 4:
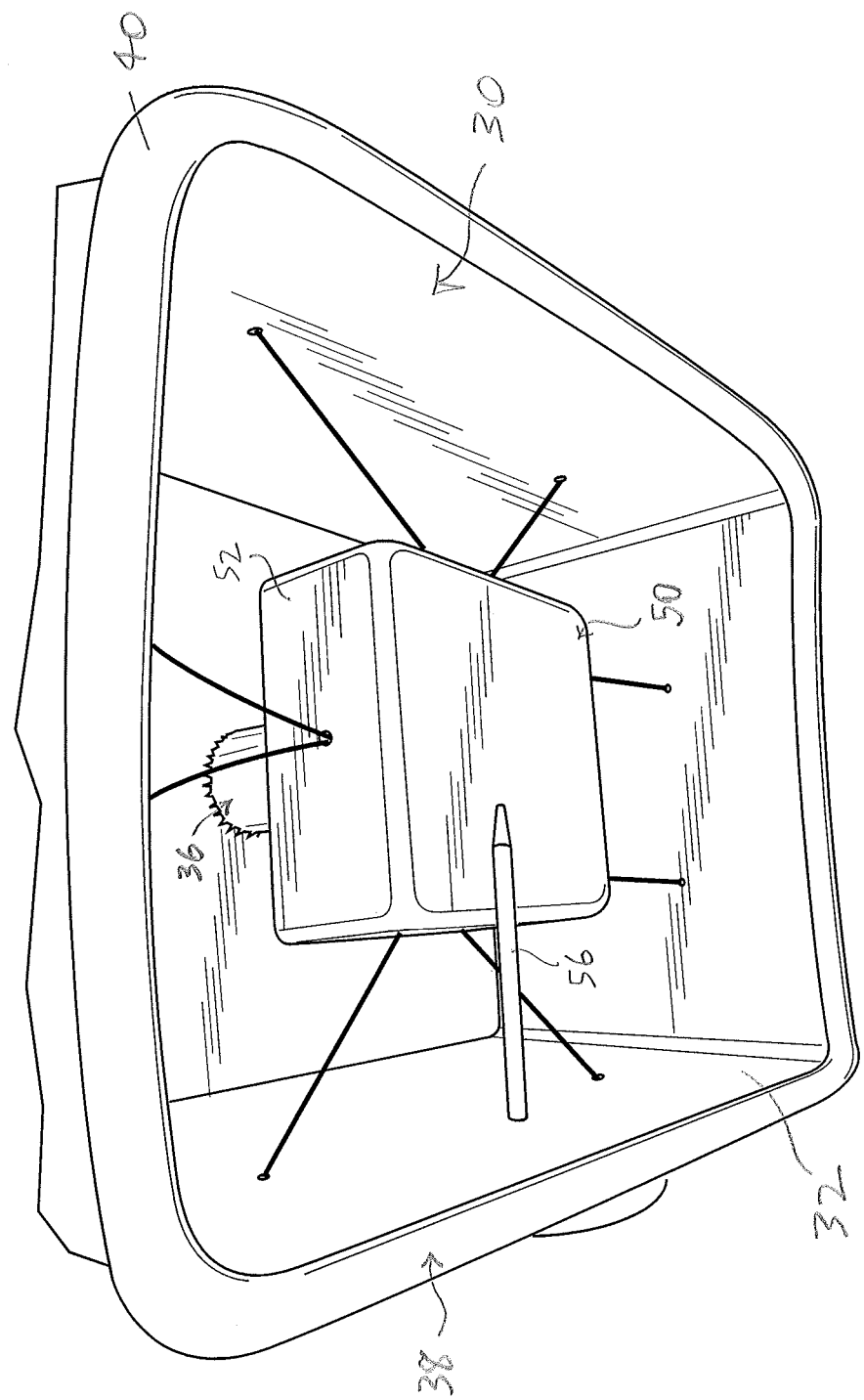
FIG. 4 is another isometric view of the cavity and the housing of FIG. 3, drawn at a larger scale.
Figure 5A:
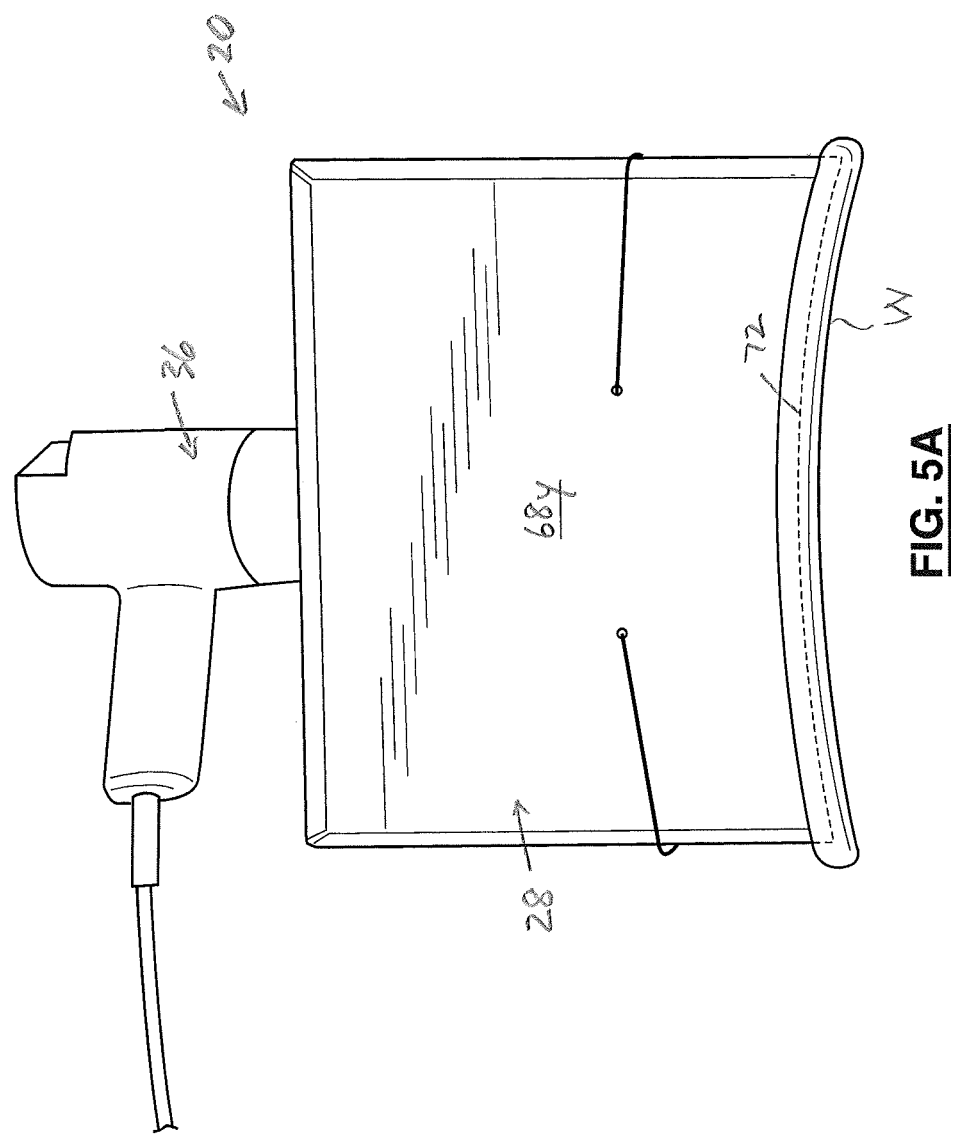
FIG. 5A is a side view of the assembly of FIG. 1, drawn at a smaller scale.
Figure 5B:
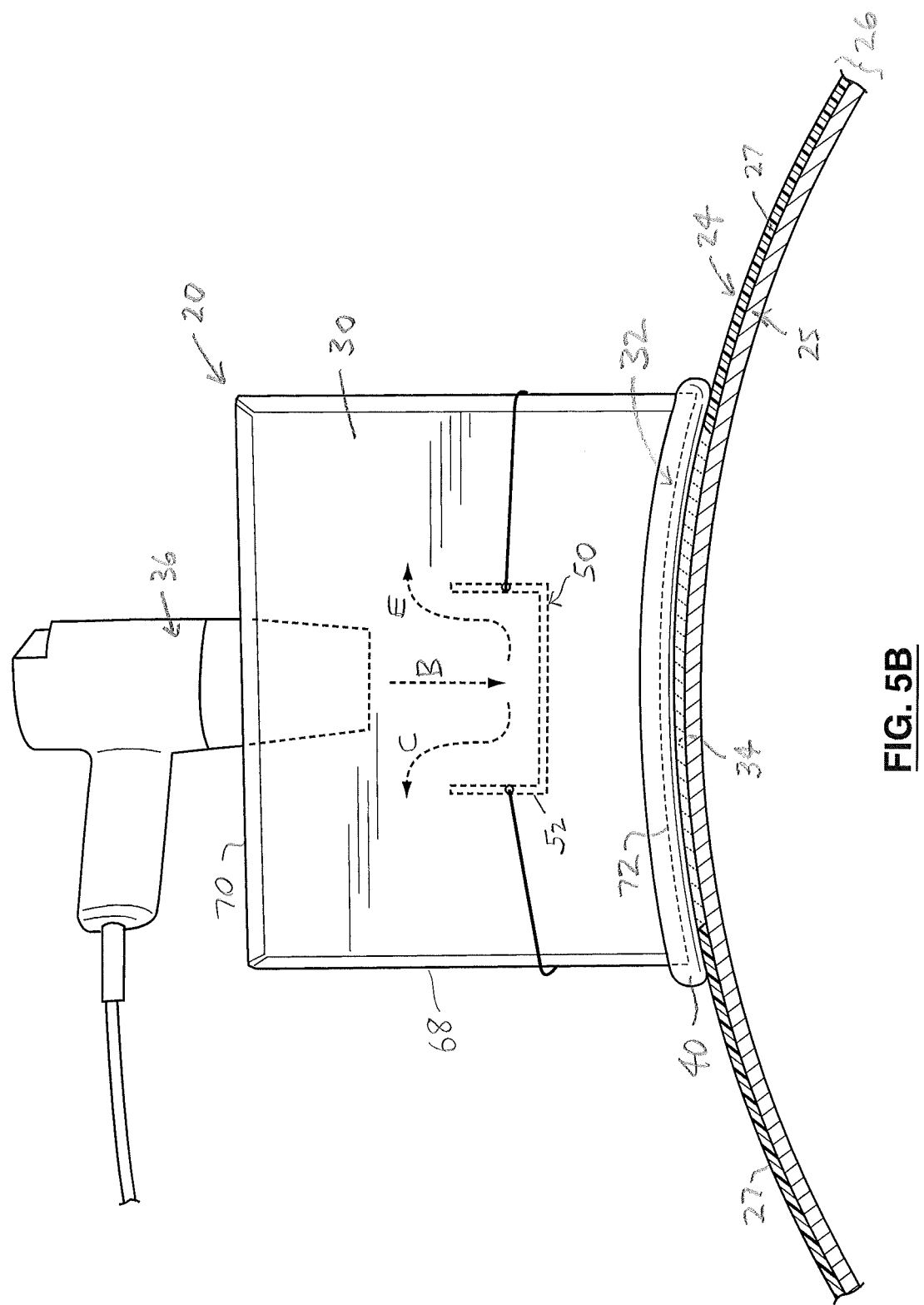
FIG. 5B is a side view of the assembly of FIG. 5A, with certain hidden elements outlined in ghost outline.
Figure 5C:
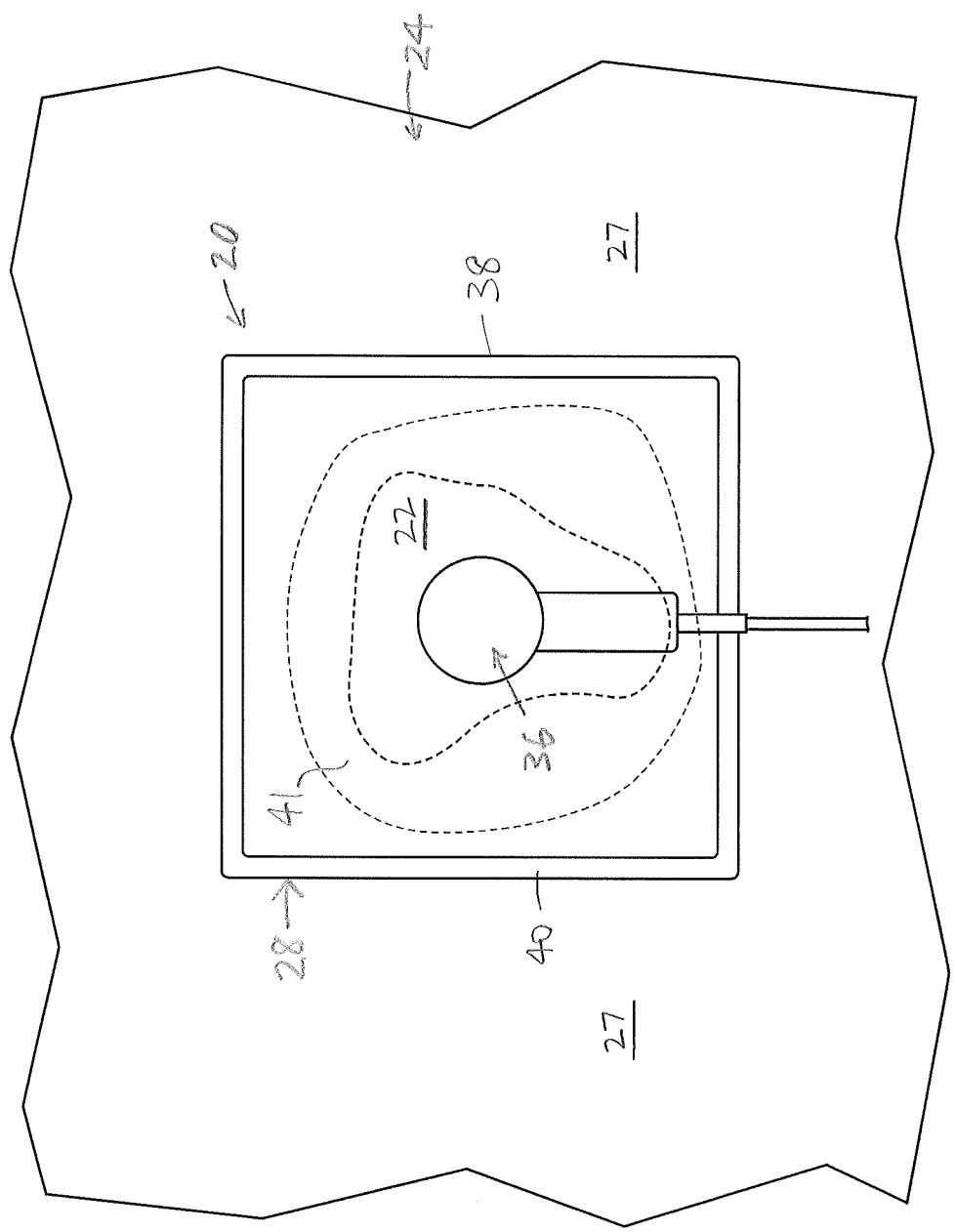
FIG. 5C is a plan view of the assembly of FIG. 5A in position on the pipe.

In the attached drawings, like reference numerals designate corresponding elements throughout. Reference is first made to FIGS. 2-7, 9, and 10 to describe an embodiment of an assembly of the invention indicated generally by the numeral 20. As will be described, the assembly 20 is for repairing a damaged portion 22 of a fusion bonded epoxy coating 24 on a steel body 25 of a pipe 26 (FIG. 5B) that is at least partially surrounded by an undamaged portion 27 of the coating 24 (FIG. 5C). In one embodiment, the assembly 20 preferably includes a housing 28 defining a cavity 30 therein and including one or more openings 32 in communication with the cavity 30 (FIGS. 2-4, 5B). Preferably, the housing 28 is attachable to the pipe 26 to locate the cavity 30 in communication with an epoxy patch 34 positioned on the steel body 25 to replace at least the damaged portion 22 (FIG. 5B). It is also preferred that the assembly 20 includes one or more heat sources 36 positioned for directing heated air heated thereby into the cavity 30, for curing the epoxy patch 34. As can be seen in FIG. 4, the opening 32 preferably is at least partially defined by a perimeter 38. It is also preferred that the assembly 20 includes an insulation strip 40 (FIGS. 3, 4) positioned on the perimeter 38 for impeding heat transfer from the housing 28 to the undamaged portion 27 of the coating 24 when the housing 28 is attached to the pipe 26, as will be described.

It will be understood that, in practice, the damaged portion 22 preferably is removed, so that the exterior surface of the steel body 25 that was covered by the damaged portion 22 is exposed. (As noted above, it will be understood that the "damaged portion" of the FBE coating may include (i) parts of the coating that are scraped or otherwise damaged and are positioned on the steel body, and/or (ii) any regions where the coating had been removed, exposing the steel body.) As a practical matter, it is sometimes difficult to determine the extent of the damaged portion 22 until parts of the undamaged portion 27 are removed, to expose the steel body 25. Also, the damaged portion 22 may have an irregular outline, and it may be expeditious to remove parts of the undamaged portion 27, to provide a more regularly-shaped area, for convenience in repair. The exterior surface of the steel body 25 preferably is then abraded, as is known. Accordingly, and as can be seen in FIG. 5C, an area 41 of the steel body 25 that is larger in area than the damaged portion 22 may be formed in connection with preparation of the damaged portion so that the FBE coating 24 may be repaired, resulting from removal of the damaged portion 22 and removal of parts of the undamaged portion 27 and other preparation work, including abrasion of the part of the steel body 25 (i.e., the area 41) that is exposed.

In FIG. 5C, the area 41 after preparation is shown. As can be seen in FIG. 5C, the area 41 may be larger than the damaged portion 22, and in one arrangement, after preparation of the area 41 of the exposed steel body 25, the damaged portion 22 is subsumed in the area 41. When the area 41 is ready, the epoxy patch 34 is positioned on the area 41. It will be understood that the arrangement illustrated in FIG. 5C is exemplary only. For instance, as illustrated in FIG. 5C, the area 41 is entirely within the perimeter 38 defining the opening 32 of the housing 28. Those skilled in the art would appreciate that, where the area 41 (and the area of the epoxy patch 34) is larger than the area of the opening 32, the housing 28 may be positioned on part of the area 41 (i.e., on part of the epoxy patch 34). Where the area 41 (or the area of the epoxy patch 34, as the case may be) is larger than the area of the opening 32, the housing is positioned to treat a first part, and then moved to treat the balance of the area 41 (or the area of the epoxy patch 34, as the case may be).

It is important that condensation on the steel body be minimized. Because of this, the exposed area 41 of the steel body 25 is required to be at least 3° C. warmer than the dew point. It is preferred that, before preparation of the area 41 has begun, the assembly 20 is positioned on the pipe 26 so that the cavity 32 is in communication with the damaged portion 22. This has been found to be advantageous because, as will be described, in one embodiment, the assembly 20 can determine the dew point of the air in the cavity, and whether the surface of the pipe 26 (i.e., including the damaged portion 22) is at risk of water condensation thereon. In addition, if it is necessary to heat the damaged portion (e.g., to increase the temperature to at least 3° C. greater than the dew point), the assembly 20 preferably is used to heat the damaged portion 22. Subsequently, the damaged portion 22 may be removed in whole or in part, in connection with the preparation of the area 41, as described above.

Also, once the area 41 has been prepared as described above, it is preferred that the housing 28 is positioned on the pipe 26 so that the cavity is in communication with the area 41, to preheat the area 41. In these circumstances, it is preferred that the dew point is determined, and the area 41 is heated so that its surface "ES" is at least 3° C. greater than the dew point before the epoxy patch 34 is applied to the area 41.

Figure 6A:
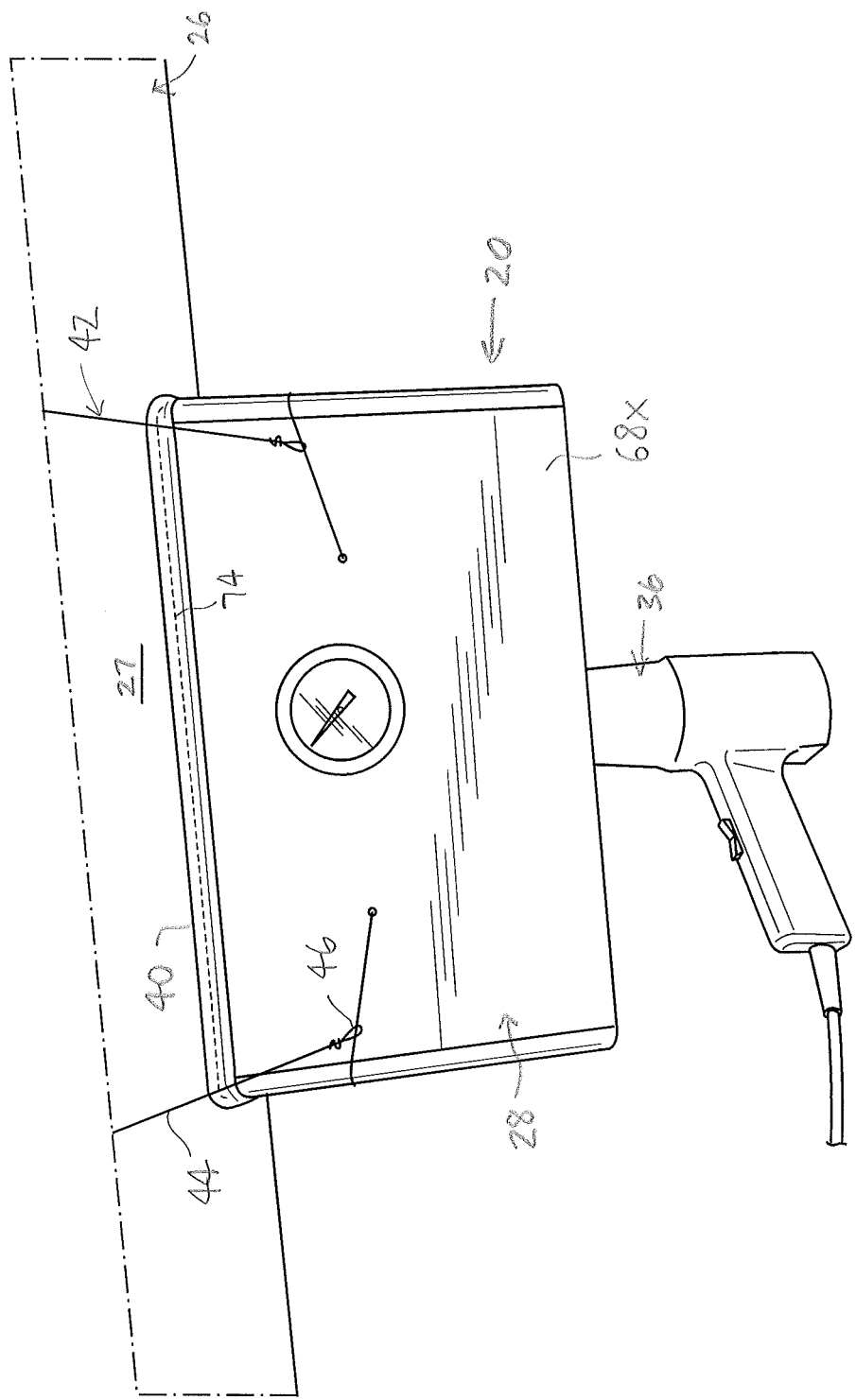
FIG. 6A is a side view of the system mounted on the steel pipe for curing epoxy.
Figure 6B:
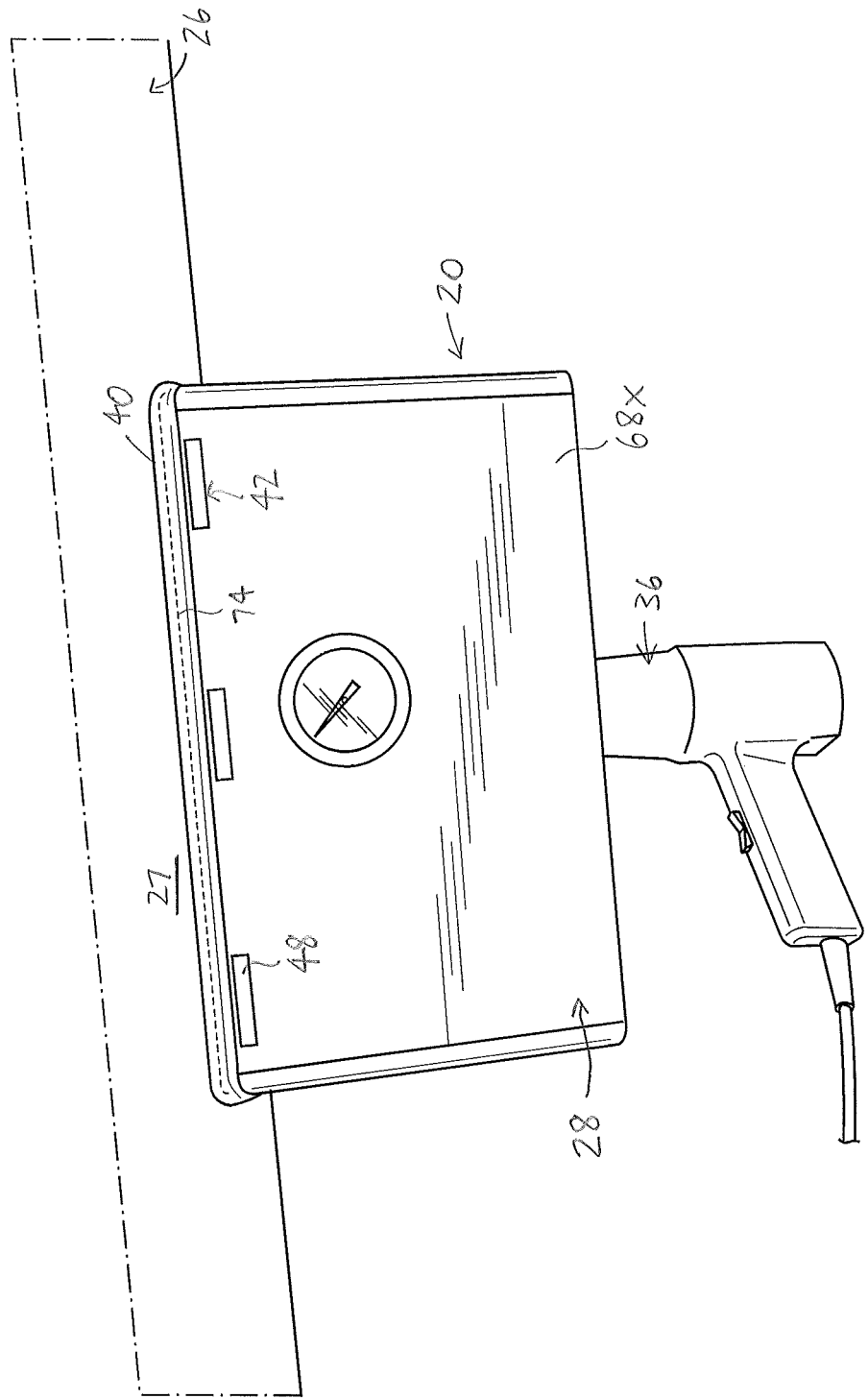
FIG. 6B is a side view of the housing held on the pipe by an alternative embodiment of the attachment device of the invention.

As can be seen in FIG. 6A, in one embodiment, the assembly 20 preferably also includes one or more attachment devices 42 for attaching the housing 28 to the pipe 26 with the insulation strip 40 at least partially positioned between the housing 28 and the undamaged portion 27 of the coating 24. Those skilled in the art would appreciate that the attachment device 42 may be any suitable device that holds the housing 28 securely against the pipe 16. For example, as can be seen in FIG. 6A, in one embodiment, the attachment device 42 preferably includes elongate members 44, each wrapped around the pipe 26 and secured (directly or indirectly) at its ends 46 to the housing 28.

In an alternative embodiment, the attachment device 42 preferably includes one or more electromagnets 48. Those skilled in the art would appreciate that the electromagnets 48 preferably are energized when the housing is in position over the patch 34, to hold the housing 26 securely against the pipe 26. Preferably, the electromagnets are mounted directly on the housing, which preferably is made of a ferromagnetic material capable of temporary magnetization when the electromagnets are energized. Preferably, the temporarily magnetized housing is sufficiently attracted to the steel body that the housing is held securely against the pipe.

Figure 10:
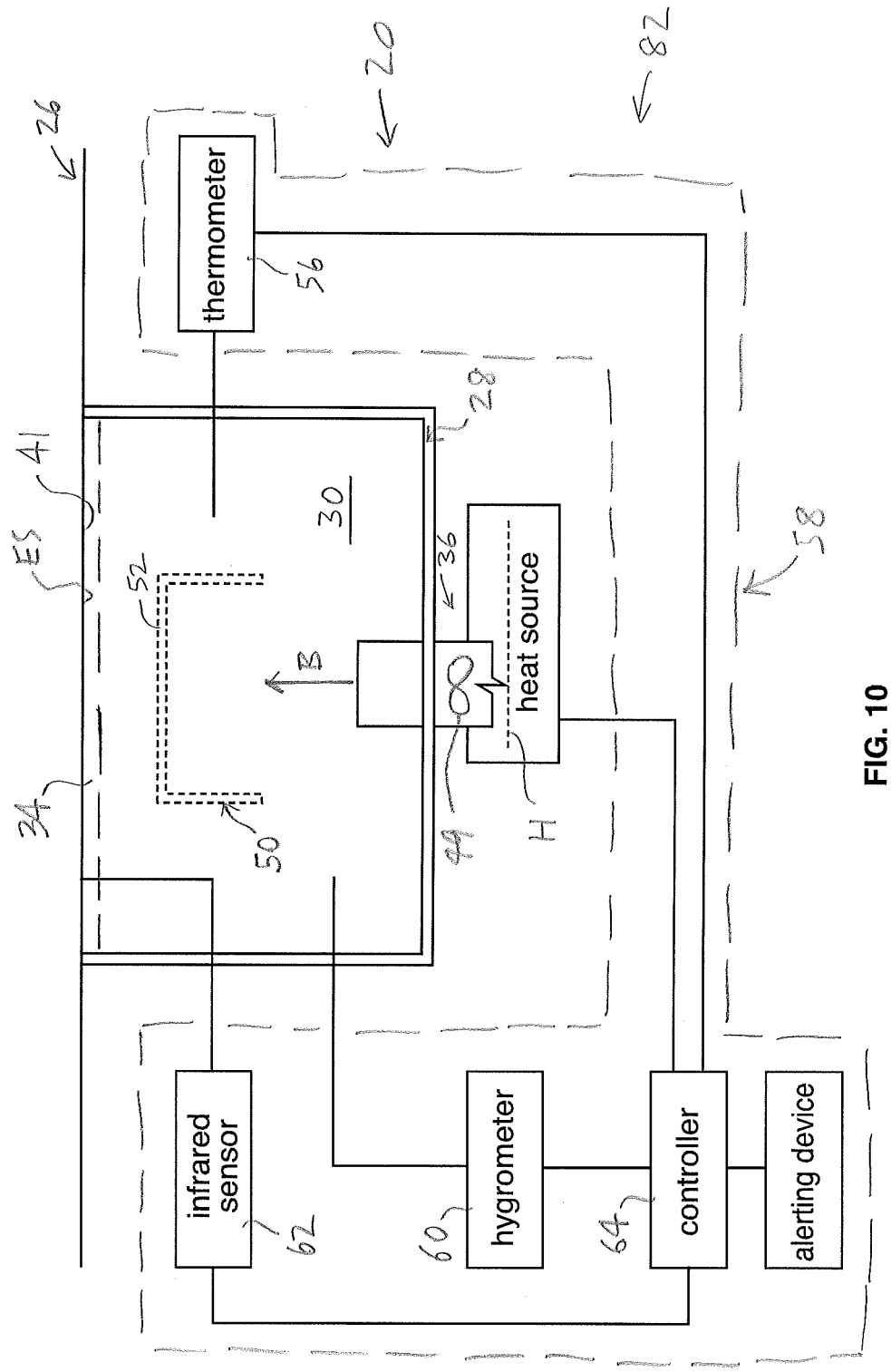
FIG. 10 is a block diagram representing an embodiment of a system of the invention.

It will be understood that the heat source 36 preferably includes a means for directing the heat generated thereby into the cavity 30. For example, in one embodiment, the heat source 36 preferably includes a fan 49 (FIG. 10) that is rotated by a fan motor (not shown) and draws (or pushes) air through a heating element "H" (FIG. 10), where heat is transferred to the air, and the heated air is subsequently drawn (or pushed) into the cavity 30. The heated air is directed into the cavity 30 by the heat source 36, as schematically indicated in FIGS. 5B and 10 by arrow "B". Because the arrangement of the heating element and the fan, and a fan motor to rotate the fan, are well-known in the art, further description of the heat source is unnecessary.

It is believed that the assembly 20 cures the epoxy patch 34 thoroughly, effectively and efficiently because the heat produced by the heat source 36 is generally consistently distributed throughout the cavity 30, i.e., the air in the cavity is maintained at a substantially consistent temperature. In one embodiment, the assembly 20 preferably includes a diffuser 50 (FIGS. 4, 5B, 10) for diffusing the heated air heated by the heat source 36 throughout air in the cavity 30, to provide an air mixture in the cavity 30 having a substantially consistent temperature throughout. Those skilled in the art would be aware of various forms of diffusers or other elements that may be used for mixing together heated air from the heat source 36 and cooler air in the cavity 30. In one embodiment, for instance, it is preferred that the diffuser 50 includes a baffle element 52 configured for mixing the heated air with the air in the cavity 30. The baffle element 52 preferably is formed for mixing the heated air and the air in the cavity 30 together.

As schematically illustrated in FIG. 5B, the baffle element 52 preferably is formed to redirect the heated air from the heat source 36 transversely. The stream of heated air from the heat source 36 is represented by the arrow "B". That stream of heated air is directed transversely (i.e., relative to the original direction of the heated air exiting the heat source 36), as is schematically represented by arrows "C" and "E" in FIG. 5B. It will be understood that the redirected heated air circulates in the cavity 30, to mix with such air as is already in the cavity 30. In this way, the heated air exiting the heat source 36 is prevented by the baffle element 52 from directly moving to the area 41 (or the epoxy patch 34, as the case may be), and instead is mixed with the cooler air in the cavity 30. As noted above, it is believed that the diffusion of the heated air throughout the cavity 30 by the baffle element 52 results in all the air in the cavity 30 being at substantially the same temperature, and this is thought to be important in properly curing the epoxy patch 34.

The assembly 20 preferably is controlled using any suitable means. For instance, in one embodiment, the assembly 20 preferably includes an air temperature sensor or thermometer 56 (FIGS. 2-4) for sensing a temperature of the air in the cavity 30 for determining whether a minimum temperature for curing the epoxy patch 34 is attained therein. The sensor may be any suitable temperature sensor. Preferably, the temperature sensor is a thermocouple. In this relatively simple arrangement, for example, an operator may limit the heat directed to the epoxy patch by determining whether the air is maintained at a minimum cure temperature (at a minimum) for a preselected period of time. Once the desired minimum temperature (or greater) has been maintained for the preselected time period, the operator de-energizes the heat source 36.

The foregoing is a very simple arrangement, with some disadvantages. In this arrangement, the operator is required to monitor the temperature data provided by the thermometer 56, which is the temperature of the air in the cavity, i.e., not the temperature of the epoxy patch. Because the temperature of the air is measured by the air temperature sensor 56, rather than the actual temperature of the epoxy patch 34, there may be some inaccuracy in the estimate of the temperature of the epoxy patch made by the operator. Also, the operator is unable to do some other task simultaneously, because the operator should be monitoring the temperature of the air in the cavity while the heat source 36 is energized. This arrangement also does not explicitly address the requirement that the epoxy patch (or the steel body, as the case may be) should be at least 3° C. greater than the dew point. In these circumstances, the operator preferably addresses the requirement that the area 41 and the epoxy patch 34 be at least 3° C. greater than the dew point by using other means for so doing, which may be inconvenient.

A more elaborate control subassembly 58 is schematically illustrated in FIG. 10. As can be seen in FIG. 10, in one embodiment, it is preferred that the assembly 20 includes the air temperature sensor or thermometer 56 for sensing the temperature of the air mixture in the cavity 30, and a hygrometer 60 for measuring humidity of the air mixture in the cavity 30. Preferably, the assembly 20 also includes an infrared temperature sensor 62 for sensing a patch temperature of the epoxy patch 34, and a controller 64 for controlling the heat source 36 in accordance with at least the air temperature, the humidity, and the patch temperature, so that the heat from the heat source 36 cures the epoxy patch 34. For example, data regarding the air temperature and the humidity preferably are transmitted to the controller 64. The controller 64 preferably is a suitable processor that is programmed, among other things, to determine the dew point, based on air temperature and humidity.

It is preferred that the sensor 62 is an infrared sensor because it can sense the temperature of the epoxy patch 34 without engaging the patch. The sensor 62 preferably is also used to determine the temperature of the damaged portion 22 before preparation, and also of the surface "ES" of the area 41 after preparation and before the epoxy patch 34 is applied to the area 41.

Those skilled in the art would appreciate that, as a practical matter, it is necessary that the controller 64 include a suitable processor (e.g., a microprocessor) with sufficient capacity to determine the dew point relatively quickly. Data are transmitted to the controller 64 via wires or wirelessly. Signals and information and data are transmitted from the controller 64 via wires or wirelessly.

As noted above, the epoxy patch 34 is not to be installed unless the temperature of an exterior surface "ES" of the steel body 25 in the exposed area 41 is at least 3° C. higher than the dew point. Accordingly, it is preferred that the controller 64 is configured to determine the dew point, and the controller 64 also determines whether the exposed area 41 has a temperature exceeding the dew point by at least 3° C.

As described above, in one embodiment, it is preferred that, prior to preparation of the area 41, the damaged portion 22 and the portion of the pipe 26 adjacent or proximal thereto is heated by the heat source 36 of the assembly 20, as needed to minimize the risk of condensation on the damaged portion.

In one embodiment, after the area 41 has been prepared for the epoxy patch 34, the assembly 20 preferably is positioned on the area 41, to pre-heat the area. As noted above, at this point, it is preferred that the temperature of the exposed surface "ES" of the steel body 25 is checked, to determine whether it is at least 3° C. higher than the dew point. If it is not, then heated air from the heat source is directed into the cavity, to raise the temperature of the exposed surface "ES" by conduction. When the area 41 is ready, the epoxy patch 34 is located thereon. It will be understood that the entire area 41 is covered by the epoxy patch 34, i.e., the area of the epoxy patch 34 is coincident with the area 41.

It is also preferred that, once the epoxy patch 34 is positioned on the exposed area 41, the heat source 36 is energized, and the controller 64 monitors the dew point. Provided that the patch temperature of the epoxy patch 34 is maintained at at least 3° C. greater than the dew point, then the epoxy patch 34 is cured upon it being subjected to an appropriate amount of the heat from the heat source for the necessary time period. The amount of the heat generated by the heat source 36, and the time during which the epoxy patch 34 is subjected to the heat, preferably are also controlled by the controller 64, in accordance with predetermined parameters.

For example, to cure it, the epoxy patch 34 may be held at approximately 90° C. (194° F.) for approximately 1.6 minutes. As another example, the epoxy patch 34 may be cured if it is held at approximately 50° C. (122° F.) for 16 minutes. Those skilled in the art would be aware of typical cure temperatures, and the cure times associated therewith respectively, which are affected by a number of parameters.

In one embodiment, it is preferred that, upon the predetermined parameters being satisfied, the controller 64 generates a signal indicating that the epoxy patch 34 is cured. Preferably, the assembly 20 includes an alerting device 66 that generates a suitable alarm upon receipt of a suitable signal from the controller 64. For instance, the alerting device may generate an audible signal, or a visual signal, or both, when the epoxy patch is thought to be cured. Alternatively, or in addition, the alerting device 66 may be configured to send a message (e.g., a text message, or an e-mail message) to predetermined addressees when the epoxy patch is cured.

Those skilled in the art would appreciate that the controller may also be configured to de-energize the heat source automatically, once the epoxy patch is cured.

Those skilled in the art would appreciate that the housing should be removed relatively quickly after the epoxy patch 34 has been cured.

It would also be appreciated by those skilled in the art that the housing 28 may have any suitable shape or configuration, and may be made of suitable materials. For example, in one embodiment, the housing 28 preferably includes four sidewalls 68 and an end wall 70 that is connected to the sidewalls 68. Preferably, the housing 28 is made of suitable steel, welded or otherwise joined and formed to provide a box-like structure, open on one side.

It will be understood that two of the four sidewalls are intended to be positioned substantially aligned with a longitudinal axis (not shown) defining the pipe 26, and the other two sidewalls are intended to be positioned substantially orthogonally to the axis of the pipe 26. The two sidewalls that are intended to be positioned substantially parallel to the axis are designated 68x in FIG. 3 for clarity. It will be understood that, when the pipe 26 is positioned substantially horizontally, the sidewalls 68x preferably are positioned substantially horizontally when the assembly is mounted on the pipe (FIG. 6A). The two sidewalls that are intended to be positioned substantially orthogonal to the axis are designated 68y in FIG. 3 for clarity.

It will also be understood that, when the pipe 26 is positioned substantially horizontally, the sidewalls 68y preferably are positioned substantially vertically when the assembly 20 is mounted on the pipe 26. As can be seen in FIGS. 5A and 5B, the sidewalls 68y that are intended to be positioned substantially vertically on the pipe 26 preferably include generally curved bottom edges 72. The curves defined by the bottom edges 72 preferably are formed to conform to the curved side of the pipe 26, as shown, for instance, in FIG. 5C. The sidewalls 68x that are intended to be positioned substantially parallel to the longitudinal axis of the pipe preferably include edges 74 that are substantially straight, i.e. they are formed to conform to the side of the pipe 26. Those skilled in the art would appreciate that the edges 72, 74 of the sidewalls are formed to substantially conform to the pipe 26 as indicated above in order that such edges will permit only minimal leakage of warmed air from the cavity 30 to the environment, in this way promoting the efficiency of the assembly 20.

It will be understood that the perimeter 38 is defined by the edges 72, 74. As noted above, in one embodiment, the edges 72, 74 preferably are substantially covered by the insulation 40. The outer edge "W" of the insulation 40 (FIG. 5A) is substantially parallel to the edge 72, 74 on which the insulation is positioned.

It would be appreciated by those skilled in the art that the heat source 36 may be mounted to the housing 28 in any suitable manner. For instance, in one embodiment, it is preferred that the heat source 36 is mounted in the end wall 70 (FIGS. 2, 5A, 5B).

Figure 9:
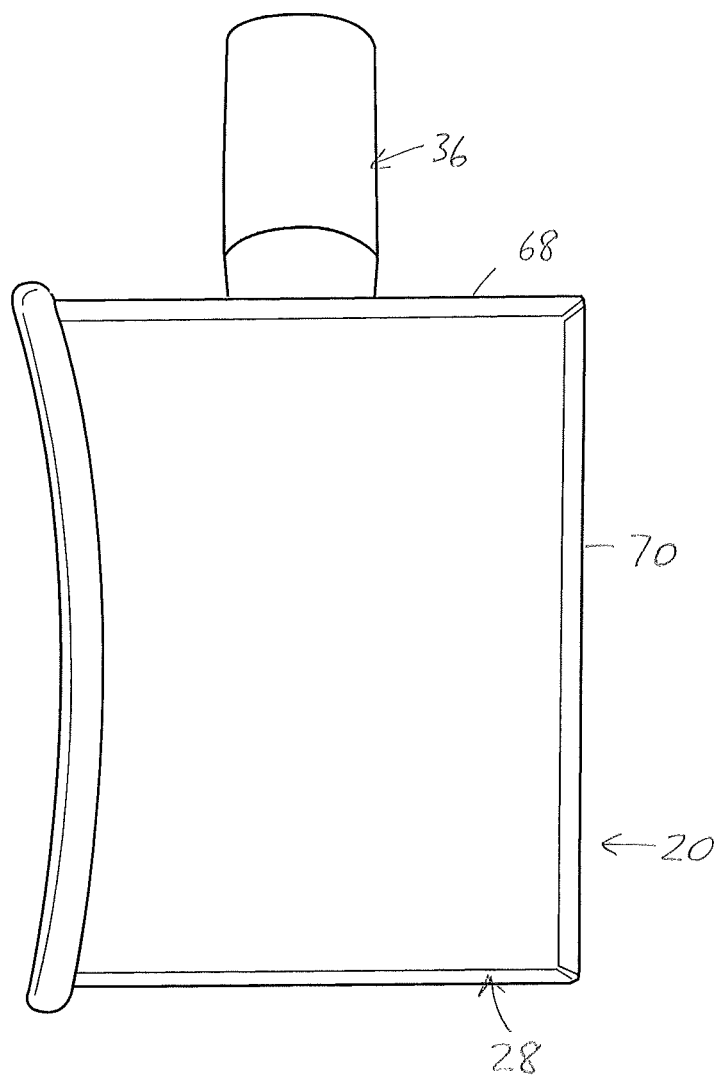
FIG. 9 is a side view of another alternative embodiment of the assembly of the invention.

In an alternative embodiment, the heat source 36 is mounted in at least a selected one of the sidewalls 68 (FIG. 9).

It would also be appreciated by those skilled in the art that the heat source 36 may be energized in any suitable manner. In one embodiment, the heat source 36 preferably is powered by electricity, and the assembly 20 additionally comprises a receptacle 72 (FIG. 7) to which electricity is provided.

Figure 8A:
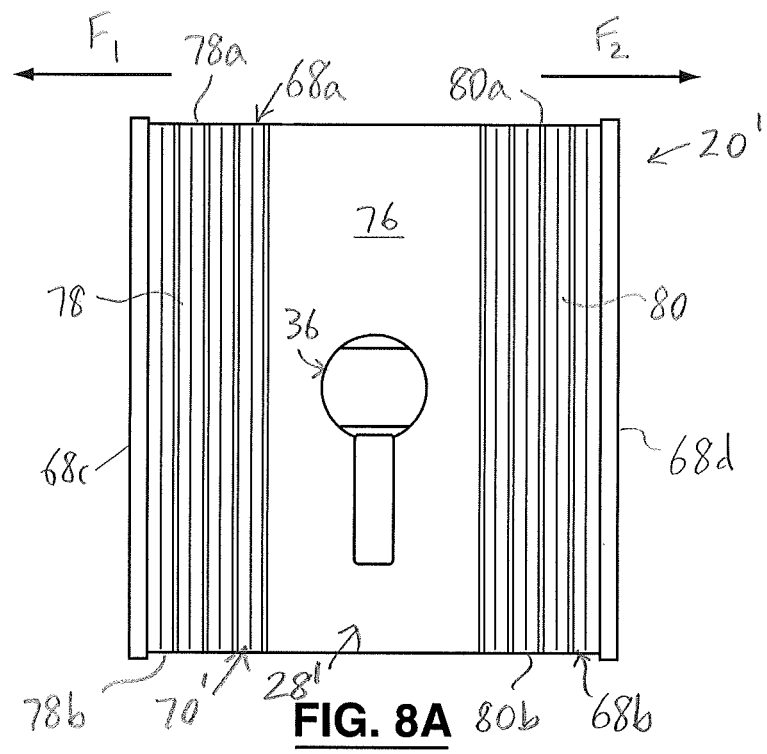
FIG. 8A is a plan view of another alternative embodiment of the assembly of the invention in which the housing is shown in a retracted condition, drawn at a smaller scale.
Figure 8B:
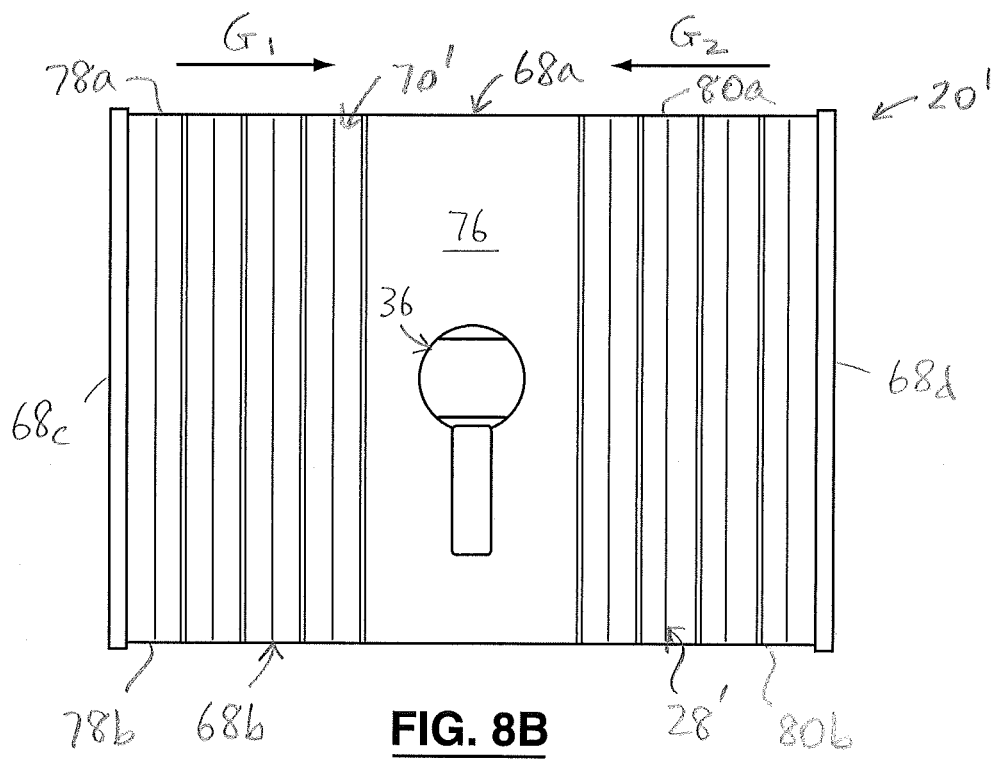
FIG. 8B is a plan view of the assembly of FIG. 8A in which the housing is shown in an expanded condition.

In another embodiment, the assembly 20' preferably includes an end wall 70' that is at least partially expandable for adjustment of the cavity 30. As can be seen in FIGS. 8A and 8B, the assembly 20' preferably includes a housing 28' that includes, in addition to the end wall 70', sidewalls 68a, 68b that are also expandable. For clarity of illustration, the non-expandable sidewalls are identified by reference numerals 68c, 68d. As can be seen in FIGS. 8A and 8B, it is preferred that the end wall 70' includes a central plate 76 and foldable portions 78, 80. Those skilled in the art would appreciate that the sidewalls 68a, 68b preferably also include foldable portions 78a, 80a and 78b, 80b respectively. As can also be seen in FIGS. 8A and 8B, to expand the cavity, the sidewalls 68c, 68d are pulled outwardly, i.e. in the directions indicated by arrows "$F_1$" and "$F_2$" in FIG. 8A, to an expanded condition. Similarly, to reduce the size of the cavity, the sidewalls 68c, 68d are moved towards each other, i.e., in the directions indicated by arrows "$G_1$" and "$G_2$" in FIG. 8B, to a retracted condition. Preferably, the housing may be formed into any position between the expanded and retracted conditions.

Those skilled in the art would appreciate that the sidewalls that include the foldable portions may be those intended to be positioned substantially parallel with the axis of the pipe, or otherwise.

The invention preferably also includes a system 82 for repairing the damaged portion 22 of the fusion bonded epoxy coating 24 on the exterior surface of the steel body 25 of the pipe 26. In one embodiment, the system preferably includes that epoxy patch 34 positionable on the steel body 25, to replace at least the damaged portion 22, and the housing 28 defining the cavity 30 therein and including one or more openings 32 in communication with the cavity 30. Preferably, the housing 28 is attachable to the pipe 26 to locate the cavity 30 in communication with the epoxy patch 34. One or more heat sources 36 positioned for directing heated air heated thereby into the cavity 30, for curing the epoxy patch 34. The opening 32 preferably is at least partially defined by the perimeter 38. As can be seen in FIG. 3, the perimeter 38 preferably is defined by the sidewalls 68. Specifically, the perimeter 38 preferably is defined by the edges 72, 74 of the sidewalls 68. It is also preferred that the system 82 includes the insulation strip 40 positioned on the perimeter 38 for impeding heat transfer from the housing 28 to the undamaged portion 27 of the coating 24 when the housing 38 is secured to the pipe 26.

An embodiment of a method 26 is schematically illustrated through an operational flow chart provided in FIGS. 11A, 11B. The method 111 preferably includes the steps of providing the assembly or heating apparatus 20 (FIG. 11A, step 113), and locating the housing 28 on the pipe 26 to position the insulation strip 40 at least partially between the housing 28 and the undamaged portion 27 of the coating 24 (step 115). With the air temperature sensor, a first air temperature of air in the cavity is sensed (step 117). With the hygrometer, a first humidity of the air in the cavity is sensed (step 119). A first dew point of the air in the cavity is then determined (step 121). With an infrared temperature sensor, a first surface temperature of the damaged portion is sensed (step 123). If the first surface temperature does not exceed the first dew point by at least 3° C., then with the heat source 26, the air in the cavity is heated to increase the surface temperature of the damaged portion to at least 3° C. greater than the first dew point, to prevent condensation of water on the damaged portion (step 129). Next, the housing 28 is removed (step 131). At least the damaged portion 22 of the coating 24 is removed to expose the area 41 of the steel body 25 at least partially surrounded by the undamaged portion 27 of the coating 24 (step 133). The housing 28 is located to position the cavity 30 in communication with at least part of the area 41 and the insulation strip 40 at least partially between the housing 28 and the undamaged portion 27 of the coating 24 (step 135). With the air temperature sensor 56, a second air temperature of the air in the cavity 30 is sensed (FIG. 11B, step 137). Next, a second dew point of the air in the cavity is determined (step 143). With the infrared temperature sensor 62, a second surface temperature of the exposed area 41 of the steel body 25 is sensed (step 145). If the second surface temperature does not exceed the second dew point by at least 3° C., then with said at least one heat source, the air in the cavity is heated to increase the surface temperature of the exposed area of the steel body to at least 3° C. greater than the second dew point, to prevent condensation of water on the exposed area 14 (step 147). Next, the epoxy patch 34 is positioned on the exposed area 41 (step 149). The housing 28 is located to position the cavity 30 in communication with at least part of the epoxy patch 34 (step 151). The said at least one heat source, the heat to heat the air in the cavity is generated, to cure the epoxy patch 34 (step 153). With the infrared temperature sensor, the temperature of the epoxy patch 34 is monitored (step 155). Based on preselected parameters, it is determined when the epoxy patch is cured (step 157). Upon determining that the epoxy patch 34 is cured, the heat source is de-energized and the housing is disengaged from the undamaged portion of the coating (step 159).

Another embodiment of the method 211 of the invention is schematically illustrated in FIG. 12. The method 211 preferably includes, first, providing the housing 28 (FIG. 12, step 261). One or more heat sources 36 are provided, positioned for directing heated air generated thereby at least partially into the cavity (step 263). The insulation strip 40 is provided, and positioned on the perimeter for impeding heat transfer from the housing to the coating on the pipe (step 265). At least the damaged portion 27 is removed to expose the area 41 of the steel body 25 (step 267). The exposed area 41 of the steel body 25 is prepared for bonding with the epoxy patch 34 (step 269). Next, the epoxy patch 34 is positioned on the exposed area 41 of the steel body 25 (step 271). The housing 28 is located to position the cavity in communication with at least part of the epoxy patch 34 (step 273). The heat source is energized to generate the heated air thereby directed into the cavity (step 275). With the diffuser element 52 located in the cavity, the heated air from the heat source is mixed with air in the cavity to provide the heated air mixture in the cavity having a substantially consistent temperature throughout for curing the epoxy patch (step 277).

Those skilled in the art would appreciate that the thickness of the epoxy coating that is originally provided on the steel body 25 is determined by the manufacturer and/or the customer, in accordance with applicable regulations and specifications. Typically, the FBE coating provided on the pipe by the manufacturer is between about 25-50 mils (i.e., 25-50 thousandths of an inch, 0.025-0.050 inches). It is believed that the thickness of the epoxy patch should be carefully controlled, because a part of the coating that is too thick may crack in response to various stresses to which the coating is subjected. For example, the stresses may be due to fluctuations in the amount of fluid moving through the pipe. However, those skilled in the art would also appreciate that the epoxy patch also should have a minimum thickness. In practice, the epoxy patch 34 tends to be somewhat thicker than the undamaged portion 27, and smoothing out the uncured epoxy positioned on the area 41 tends to be difficult. There is therefore a need for a device that may be used to shape an uncured epoxy patch 86, so that the thickness of the patch is within predetermined units.

Figure 13:
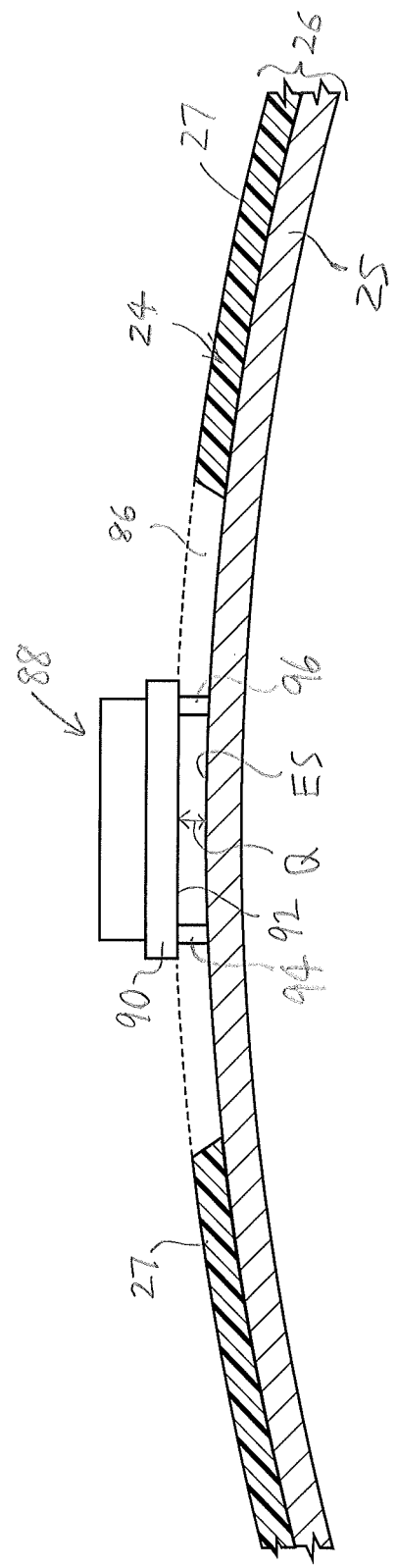
FIG. 13 is a side view of an embodiment of a forming device of the invention, drawn at a smaller scale.

As can be seen in FIG. 13, an embodiment of a forming device 88 of the invention preferably includes a body element 90 with a scraping edge 92 and two adjustable legs 94, 96 that are adjustable, to adjust the distance "Q" between the edge 92 and the surface "ES" of the steel body 25. Preferably, the lengths of the legs are adjusted to position the scraping edge 92 the predetermined distance "Q" from the surface "ES". The legs 94, 96 preferably are adjustable using any suitable mechanism (not shown).

From the foregoing and from FIG. 13, it can be seen that the device 88 may be used to smooth the epoxy patch 34, i.e., before it is cured, to result in the epoxy patch 34 having an appropriate thickness. The tool 88 is moved over the uncured epoxy patch, with the legs 94, 96 engaging the surface "ES" as the tool 88 is moved over the surface and the body element 90 pushing any extra uncured epoxy along, so that the uncured epoxy patch 86 is formed thereby with a substantially consistent thickness.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. An assembly for repairing a damaged portion of a fusion bonded epoxy coating on a steel body of a pipe at least partially surrounded by an undamaged portion of the coating, the assembly comprising:
   a housing defining a cavity therein and comprising at least one opening in communication with the cavity, the housing being attachable to the pipe to locate the cavity in communication with an epoxy patch positioned on the steel body to replace at least the damaged portion;
   at least one heat source positioned for directing heated air heated thereby into the cavity, for curing the epoxy patch;
   said at least one opening being at least partially defined by a perimeter; and
   an insulation strip positioned on the perimeter for impeding heat transfer from the housing to the undamaged portion of the coating when the housing is attached to the pipe.

2. An assembly according to claim 1 additionally comprising at least one attachment device for attaching the housing to the pipe with the insulation strip at least partially positioned between the housing and the undamaged portion of the coating.

3. An assembly according to claim 2 in which the attachment device comprises at least one electromagnet.

4. An assembly according to claim 1 additionally comprising a diffuser for diffusing the heated air heated by said at least one heat source throughout air in the cavity, to provide an air mixture in the cavity having a substantially consistent temperature throughout.

5. An assembly according to claim 4 in which the diffuser comprises a baffle element configured for mixing the heated air with the air in the cavity.

6. An assembly according to claim 5 in which the baffle element comprises a body formed for mixing the heated air and the air in the cavity together.

7. An assembly according to claim 5 additionally comprising a thermometer for sensing a temperature of the air mixture in the cavity for determining whether a minimum temperature for curing the epoxy patch is attained therein.

8. An assembly according to claim 5 additionally comprising:
   a thermometer for sensing an air temperature of the air mixture in the cavity;
   a hygrometer for measuring humidity of the air mixture in the cavity;
   an infrared temperature sensor for sensing a patch temperature of the epoxy patch; and
   a controller for controlling said at least one heat source in accordance with at least the air temperature, the humidity, and the patch temperature such that the heat from said at least one heat source cures the epoxy patch.

9. An assembly according to claim 8 in which, upon predetermined conditions being satisfied, the controller generates a signal indicating that the epoxy patch is cured.

10. An assembly according to claim 1 in which the housing comprises four sidewalls and an end wall connected to the sidewalls.

11. An assembly according to claim 10 in which said at least one heat source is mounted in the end wall.

12. An assembly according to claim 10 in which said at least one heat source is mounted in at least a selected one of the sidewalls.

13. An assembly according to claim 1 in which:
   said at least one heat source is powered by electricity; and
   the assembly additionally comprises a receptacle to which electricity is provided.

14. An assembly according to claim 10 in which the end wall is at least partially expandable for adjustment of the cavity.

15. A system for repairing a damaged portion of a fusion bonded epoxy coating on a steel body of a pipe, the system comprising:
   an epoxy patch positionable on the steel body, to replace at least the damaged portion;
   a housing defining a cavity therein and comprising at least one opening in communication with the cavity, the housing being attachable to the pipe to locate the cavity in communication with the epoxy patch;
   at least one heat source positioned for directing heated air heated thereby into the cavity, for curing the epoxy patch;
   said at least one opening being at least partially defined by a perimeter; and
   an insulation strip positioned on the perimeter for impeding heat transfer from the housing to the undamaged portion of the coating when the housing is secured to the pipe.

16. A method of repairing a damaged portion of a fusion bonded epoxy coating on a steel body of a pipe, the damaged portion being at least partially surrounded by an undamaged portion of the coating, the method comprising the steps of:

(a) providing a heating apparatus comprising a housing defining a cavity therein and comprising at least one opening in communication with the cavity, said at least one opening being at least partially defined by a perimeter of the housing, the heating apparatus comprising at least one heat source and an insulation strip positioned on the perimeter for impeding heat transfer from the housing to the undamaged portion of the coating;
(b) locating the housing on the pipe to position the insulation strip at least partially between the housing and the undamaged portion of the coating;
(c) with an air temperature sensor, sensing a first air temperature of air in the cavity;
(d) with a hygrometer, sensing a first humidity of the air in the cavity;
(e) determining a first dew point of the air in the cavity;
(f) with an infrared temperature sensor, sensing a first surface temperature of the damaged portion;
(g) if the first surface temperature does not exceed the first dew point by at least 3° C., then with said at least one heat source, heating the air in the cavity to increase the surface temperature of the damaged portion to at least 3° C. greater than the first dew point, to prevent condensation of water on the damaged portion;
(h) removing the housing;
(i) removing at least the damaged portion of the coating to expose an area of the steel body at least partially surrounded by the undamaged portion of the coating;
(j) locating the housing to position the cavity in communication with at least part of the area and the insulation strip at least partially between the housing and the undamaged portion of the coating;
(k) with the air temperature sensor, sensing a second air temperature of the air in the cavity;
(l) with the hygrometer, sensing a second humidity of the air in the cavity;
(m) determining a second dew point of the air in the cavity;
(n) with the infrared temperature sensor, sensing a second surface temperature of the exposed area of the steel body;
(o) if the second surface temperature does not exceed the second dew point by at least 3° C., then with said at least one heat source, heating the air in the cavity to increase the surface temperature of the exposed area of the steel body to at least 3° C. greater than the second dew point, to prevent condensation of water on the exposed area;
(p) positioning an epoxy patch on the exposed area;
(q) locating the housing to position the cavity in communication with at least part of the epoxy patch;
(r) with said at least one heat source, generating the heat to heat the air in the cavity to cure the epoxy patch;
(s) with the infrared temperature sensor, monitoring the temperature of the epoxy patch;
(t) based on preselected parameters, determining when the epoxy patch is cured; and
(u) upon determining that the epoxy patch is cured, de-energizing said at least one heat source and disengaging the housing from the undamaged portion of the coating.

17. A method of curing an epoxy patch to repair a damaged portion of a fusion bonded epoxy coating on a steel body of a pipe, the method comprising:
(a) providing a housing defining a cavity therein and comprising at least one opening in communication with the cavity, said at least one opening being at least partially defined by a perimeter of the housing;
(b) providing at least one heat source positioned for directing heated air generated thereby at least partially into the cavity;
(c) providing an insulation strip positioned on the perimeter for impeding heat transfer from the housing to the coating on the pipe;
(d) removing at least the damaged portion to expose an area of the steel body;
(e) preparing the exposed area of the steel body for bonding with an epoxy patch;
(f) positioning the epoxy patch on the exposed area of the steel body;
(g) locating the housing to position at least part of the epoxy patch in communication with the cavity;
(h) energizing said at least one heat source to generate the heated air thereby directed into the cavity; and
(i) with a diffuser element located in the cavity, mixing the heated air from said at least one heat source with air in the cavity to provide a heated air mixture in the cavity having a substantially consistent temperature throughout for curing the epoxy patch.

* * * * *